(12) United States Patent
Light et al.

(10) Patent No.: US 7,088,802 B2
(45) Date of Patent: Aug. 8, 2006

(54) METHOD AND APPARATUS FOR OBTAINING TELEPHONE STATUS OVER A NETWORK

(76) Inventors: Elliott D. Light, 12 Bentana Way, Rockville, MD (US) 20850; Jon L. Roberts, 529 Clear Springs Rd., Great Falls, VA (US) 22066

( * ) Notice: Subject to any disclaimer, the term of this patent is extended or adjusted under 35 U.S.C. 154(b) by 726 days.

(21) Appl. No.: 09/759,107

(22) Filed: Jan. 12, 2001

(65) Prior Publication Data

Related U.S. Application Data

(63) Continuation-in-part of application No. 08/963,373, filed on Nov. 3, 1997, now Pat. No. 6,175,616, and a continuation-in-part of application No. 09/265,656, filed on Mar. 2, 1999, now Pat. No. 6,483,900.

(51) Int. Cl.
*H04M 1/64* (2006.01)

(52) U.S. Cl. ................. 379/88.17; 455/466; 379/32.01

(58) Field of Classification Search ............. 379/32.01, 379/67.1, 88.11, 88.12, 88.14, 88.15, 88.16, 379/88.17; 455/412.1, 412.2, 413, 414.1, 455/414.4, 444.1; 704/258, 277
See application file for complete search history.

(56) References Cited

U.S. PATENT DOCUMENTS

| | | | |
|---|---|---|---|
| 4,166,929 A | 9/1979 | Sheinbein | 179/18 BG |
| 4,559,416 A | 12/1985 | Theis et al. | 179/7.1 R |
| 4,734,931 A | 3/1988 | Bourg et al. | 379/93 |
| 4,759,055 A | 7/1988 | Okumura et al. | 379/157 |
| 5,023,868 A | 6/1991 | Davidson et al. | 370/62 |
| 5,418,835 A * | 5/1995 | Frohman et al. | 455/413 |
| 5,425,091 A | 6/1995 | Josephs | 379/201 |
| 5,500,893 A | 3/1996 | Onosaka | 379/396 |
| 5,530,740 A | 6/1996 | Irribarren et al. | 379/89 |
| 5,647,002 A | 7/1997 | Brunson | 380/49 |
| 5,742,668 A * | 4/1998 | Pepe et al. | 455/415 |
| 5,794,143 A * | 8/1998 | McCarthy et al. | 455/422.1 |
| 5,796,394 A * | 8/1998 | Wicks et al. | 345/751 |
| 5,928,325 A * | 7/1999 | Shaughnessy et al. | 709/206 |
| 5,943,399 A * | 8/1999 | Bannister et al. | 379/88.17 |
| 6,175,616 B1 | 1/2001 | Light et al. | 379/88.14 |
| 6,208,725 B1 * | 3/2001 | Davies | 379/201.01 |
| 6,438,217 B1 * | 8/2002 | Huna | 379/88.14 |
| 6,671,355 B1 * | 12/2003 | Spielman et al. | 379/88.12 |

OTHER PUBLICATIONS

"They're Here: Portable E-Mail and Voice Mail", PC WEEK p. 55 Feb. 12, 1990.*

* cited by examiner

*Primary Examiner*—Fan Tsang
*Assistant Examiner*—Olisa Anwah
(74) *Attorney, Agent, or Firm*—Roberts Mardula & Wertheim, LLC.

(57) ABSTRACT

A system and method for determining telephone status over a network. The system and method provides for off hook status to be determined by a switch or other monitor that then provides that information to a telephone status file. The telephone status file is accessible over the Internet by computer so that a calling party can first determine if the called party is on the telephone. Thus wasted time in making calls that cannot be completed is avoided. The system operates over normal PSTN's, over cable systems, and over the Internet.

8 Claims, 5 Drawing Sheets

METHOD AND APPARATUS FOR OBTAINING TELEPHONE STATUS OVER A NETWORK

CROSS REFERENCE TO RELATED APPLICATIONS

This application is a continuation in part application of application Ser. No. 08/963,373, filed Nov. 3, 1997, now U.S. Pat. No. 6,175,616 and a continuation in part of application Ser. No. 09/265,656, filed Mar. 2, 1999, now U.S. Pat. No. 6,483,900.

BACKGROUND OF THE INVENTION

This invention relates generally to electronically determining the status of a telephone over a network. More specifically, the present invention provides a method and apparatus for obtaining the status of a telephone (whether on-hook or off-hook) over a network in order to maximize the probability of reaching a desired party. It also provides a method and apparatus for sending an e-mail to the desired party for storage as a voice mail message.

Literally millions of times per day, parties attempt to contact one another, only to find that the party initiating the telephone call receives a busy signal or is put into the phone mail of the receiving telephone when that telephone is off-hook. Not only is this experience frustrating for the caller, but also can result in lost business or social opportunities on the part of the receiving party who is on the line speaking with someone else. In addition, receiving busy signals and the inability to complete telephone calls results in the loss of millions of dollars in revenue both from the time expended by the caller in trying to reach the desired party, as well as lost opportunities for commerce or other social contact.

Telephone line activity monitoring has been the subject of invention in the past. A form of line activity monitoring has been proposed for the purpose of obtaining information regarding statistics of line usage. This proposed system detects the usage of the line, but does not transmit status information to others in any current fashion. For further details, refer to U.S. Pat. No. 4,559,416 to Theis et al.

Another monitoring system has been described whose purpose is to notify an operator that a telephone line is open so that a desired message can be delivered by the operator to a receiving party. This system comprises an automatic dialer that attempts to reach individuals on a repetitive basis until a connection is made. Again, status of the telephone at any given point of time is not provided. For further details, refer to U.S. Pat. No. 3,989,899 to Norwich.

An integrated calling directory has been described that utilizes a personal computer that stores information about the numbers being called. It does not address the problem associated with the called party telephone being in an off-hook condition. This condition is not reported in any fashion to the initiator of the telephone call. For further details, refer to U.S. Pat. No. 4,734,931 to Bourg et al.

A communication system has been proposed that uses a voice message system for storing and retrieving voice messages and faxed data and for converting text into voice messages. This proposed system does not deal with the issue of how to contact the party receiving the phone call but only leaves a message for that party in the event that the phone is in an off-hook condition. For further details, refer to U.S. Pat. No. 5,530,740 to Irribarren et al.

Another information processing system has been described as having a telephone and an informational processing device. This system does not address the issue of whether a called party telephone is in an on-hook or off-hook condition. For further details, refer to U.S. Pat. No. 5,500,893 to Onosaka.

A system for synchronization of mail boxes over a network has been proposed. This system is designed to ensure that information in electronic mail is complete in a series of different mailboxes. The issue of providing information to a caller regarding the status of a called party's telephone is not dealt with. For further details, refer to U.S. Pat. No. 5,647,002 to Brunson.

What is desired is a system whereby a calling party can pre-determine the status of a called party's telephone (on-hook or off-hook) so as to maximize the opportunity for completing a telephone call to the desired party.

SUMMARY OF THE INVENTION

It is therefore an object of the present invention to maximize the probability that a calling party will actually contact a called party when a telephone call is made.

It is a further objective of the present invention to provide a status of the called party's telephone (on-hook or off-hook) before the calling party makes the telephone call to the called party.

It is a further objective of the present invention to provide telephone status information over a network.

It is a further objection of the present invention to continually monitor the status of a telephone in order to provide the telephone in order to provide the telephone status information desired.

It is a further objective of the present invention to store telephone line status in a file that can be accessed by others.

It is a further objective of the present invention to constantly update the telephone line status file so that callers accessing the file can have an up-to-date record of the status of a telephone to be called.

It is a further objective of the present invention to obtain the status of a called party's telephone over cable systems connected to public switched telephone networks.

It is yet another objection to obtain the status of a called party's telephone when both the called party and the calling party are connected to cable systems.

It is a further objective of the present invention to obtain the status of a called party's telephone when the called party is connected to a cable system but the calling party is not.

It is yet another objective of the present invention to generally provide information concerning home and office equipment and functions to a file that can be accessed by networks external to the home, such as the Internet.

These and other objectives of the present invention will become apparent from a review of the general and detailed descriptions that follow. The present invention provides a method for a calling party to receive constantly updated information concerning the status of a telephone (on-hook or off-hook) to be called. For purposes of this specification this status will generally be called the "telephone status." The present invention also provides a way for a calling party to leave e-mail and voice mail to the called party as part of the determination of telephone status.

The present invention comprises a monitoring system that can constantly poll a series of telephones, and stores information concerning the telephone status in a telephone status file. Alternatively, the system switch simply records the off-hook status of a telephone of the system and provides a notation to a file that is accessible to others. Thus, a telephone is presumed to be on-hook unless it is determined to be off-hook. That file is one that, in a preferred embodiment, can be accessed over the Internet. When a calling party desires to maximize its probability of actually being connected with a called party, the calling party accesses the telephone's status file over the Internet and receives a determination of whether the called telephone is on-hook or off-hook. When an off-hook condition is noted, the calling party will not attempt to place the telephone call. In addition, the calling party may elect to alert the called party that a call was attempted, to send an e-mail and have the e-mail delivered as a voice mail message, or to be signaled when the called party's phone is on-hook. When the telephone status is noted as on-hook, the calling party can then make the telephone call with some reasonable assurance of reaching the telephone of the called party.

This system differs from existing private branch exchanges (PBX) in that a current PBX can have a "camp on" feature that allows a use to place a phone call to a telephone on the PBX, note that the called telephone is off-hook and "camp on" to the called party's telephone line so that when an on-hook condition is noted, the PBX can automatically connect the calling party to the called party. The difficulty with such camp on systems is that they cannot be used by people outside the PBX. In addition, when using the camp on feature, the call is "camped" only after is placed. The caller still has invested both time and money in exchange for a busy signal. In contrast to existing PBX camp on systems, the system and method of the present invention allows a user to be advised of the status of a telephone via network external to the location of the telephone to maximize the probability of actually making the desired connection.

An alternative embodiment of the present invention is to connect the calling party's telephone to the computer at the calling party's location. Thereafter, upon a determination by the calling party's telephone is such that a call can be made, the user's computer will then dial the user's telephone prompting the user to pick that telephone up and thereafter dial the called party's telephone thereby completing the telephone call in an automated fashion.

A further embodiment of the present invention is to use a telecommunications device (wireless or otherwise, e.g., a computer, a telephone, or a personal digital assistant) to send the called party an e-mail and then have the e-mail delivered to the called party's voice mail box. The called party retrieves the e-mail-converted-to-voice message from the voice mail box using any of a number of devices (e.g., a computer, a telephone, or a personal digital assistant).

It is also the case the telephone companies are seeking to expand their markets for both long distance and local services. This expansion has caused certain long distance to acquire cable companies in order to provide local service to customers. This cable-borne telephone is yet another way for long distance carriers to reach local users by virtue of the cable system infrastructure already in place. Where such cable infrastructure exists, it is also possible to obtain the telephone status of users telephones over the cable system.

Obtaining telephone status over the cable network occurs in a similar fashion to that already noted above. In a first embodiment, a called party's telephone is either plugged into a set-top box or other interface through which telephone services are offered. Alternatively, the called party's telephone is connected to a computer system which is in turn connected to a set-top box ore other telephone and/or data interface for those cable operations that offer Internet-over-cable service. The off-hook status of the telephone at the called party's location is determined via a switch at the telephone company (telco). That off-hook status is provided to a file that is accessible over the Internet.

Thus, a calling party, desiring to obtain the status of the telephone at a location having cable service would again access the Internet and obtain information from the telephone status file which is constantly updated by the telco switch. Conversely, information concerning telephone status file over the cable network. In this manner, any user can obtain the telephone status via a computer system linked to the Internet via a cable operator. In addition, telephone status can be provided to a telephone status file over the Internet for those telephones that can use local cable operator infrastructure to connect to the public switched telephone network.

As noted above, a calling party at the cable location can also obtain the telephone status of the called party telephone by simply using the computer that is plugged into the set-top box or other telephony/data interface provided to go over the Internet to the telephone status file. This additional cable network thereby allows updating of the telephone status file and allows telephone status to be obtained in yet another fashion.

BRIEF DESCRIPTION OF THE DRAWINGS

Additional objects and advantages of the present invention will be apparent in the following detailed description read in conjunction with the accompanying drawing figures.

DETAILED DESCRIPTION OF THE INVENTION

The present invention is a system and method for obtaining the telephone status (on-hook/off-hook) of a called party's telephone over a network external to the location of the called party's telephone, such as the Internet.

Figure 1:
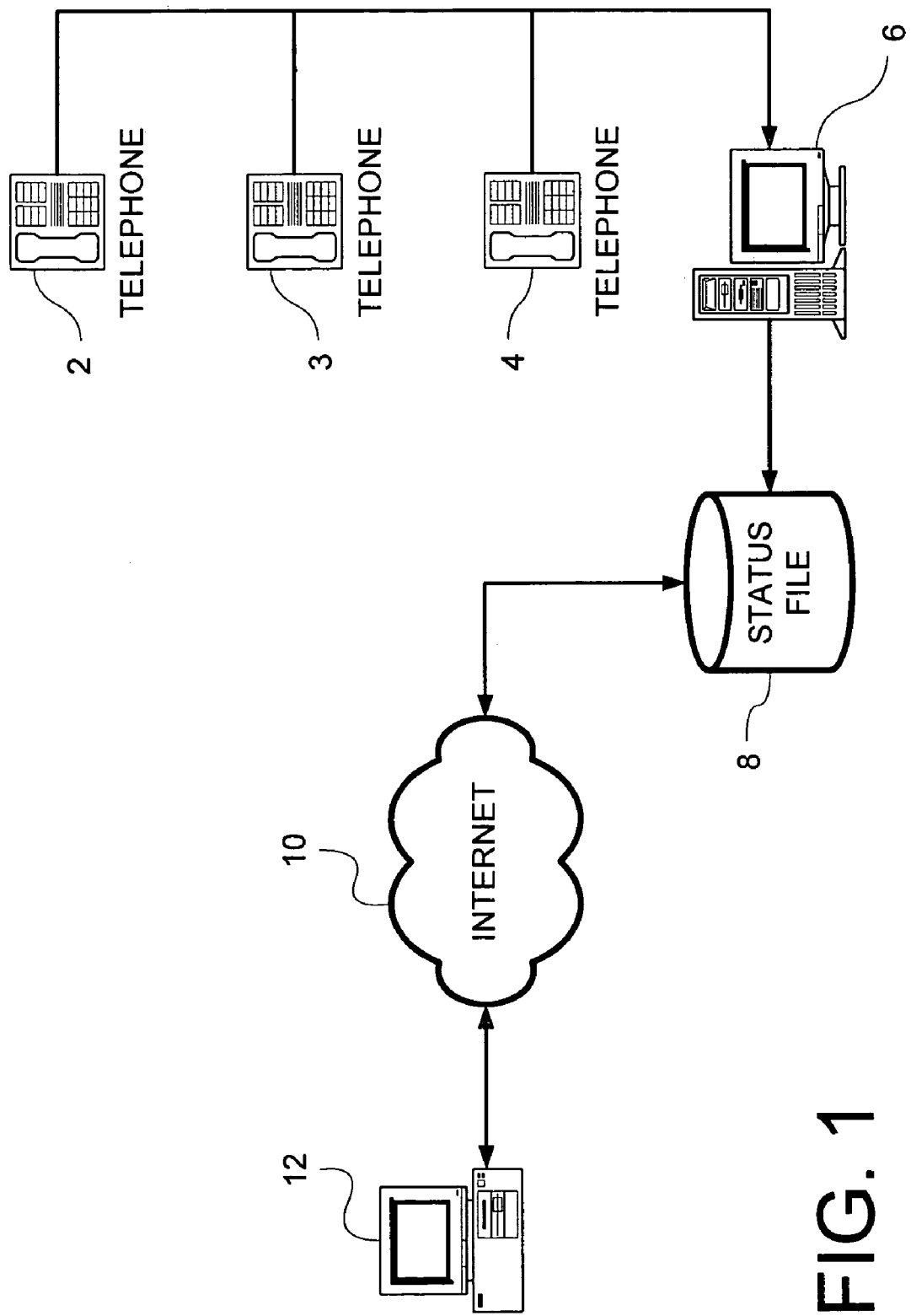
FIG. 1 illustrates the basic architecture of a telephone status monitor according to an embodiment of the present invention.

Referring to FIG. 1, the general architecture of the telephone status monitor is described. Using a personal computer or other similar type of processor 12 a user accesses a network, in this case the Internet 10, although this is not meant as a limitation. Any network that can be connected to a calling party and a called party can also be used. The calling party accesses the telephone status file 8 which is continually updated by a telephone status monitor 6 which constantly monitors a series of telephones 2, 4. It should be noted that it is anticipated that many thousands of telephones will be monitored in this fashion. Eventually it is anticipated that millions of phones will be so monitored. The monitoring function can be accomplished by special equipment for that purpose or is simply the output of a switch that recognizes when a particular telephone is off-hook on the network.

The status file 8 is continually updated by monitor 6 with the on-hook or off-hook status of telephones that are monitored. Thus, the calling party communicating with a PC 12 can receive "real time" status (as determined by the sampling rate of the monitor) of a telephone being called by simply monitoring the telephone status file that is accessible over the Internet.

Since the status file is anticipated to contain many thousands of numbers it is anticipated as past of the present invention that when a calling party using its PC 12 requests the status of a particular telephone that only the status of that telephone will subsequently be displayed on the user PC. Alternatively, the user PC 12 may create a list of numbers to monitor and have the data "pushed" over the Internet 10 to the calling party's PC 12.

Figure 2:
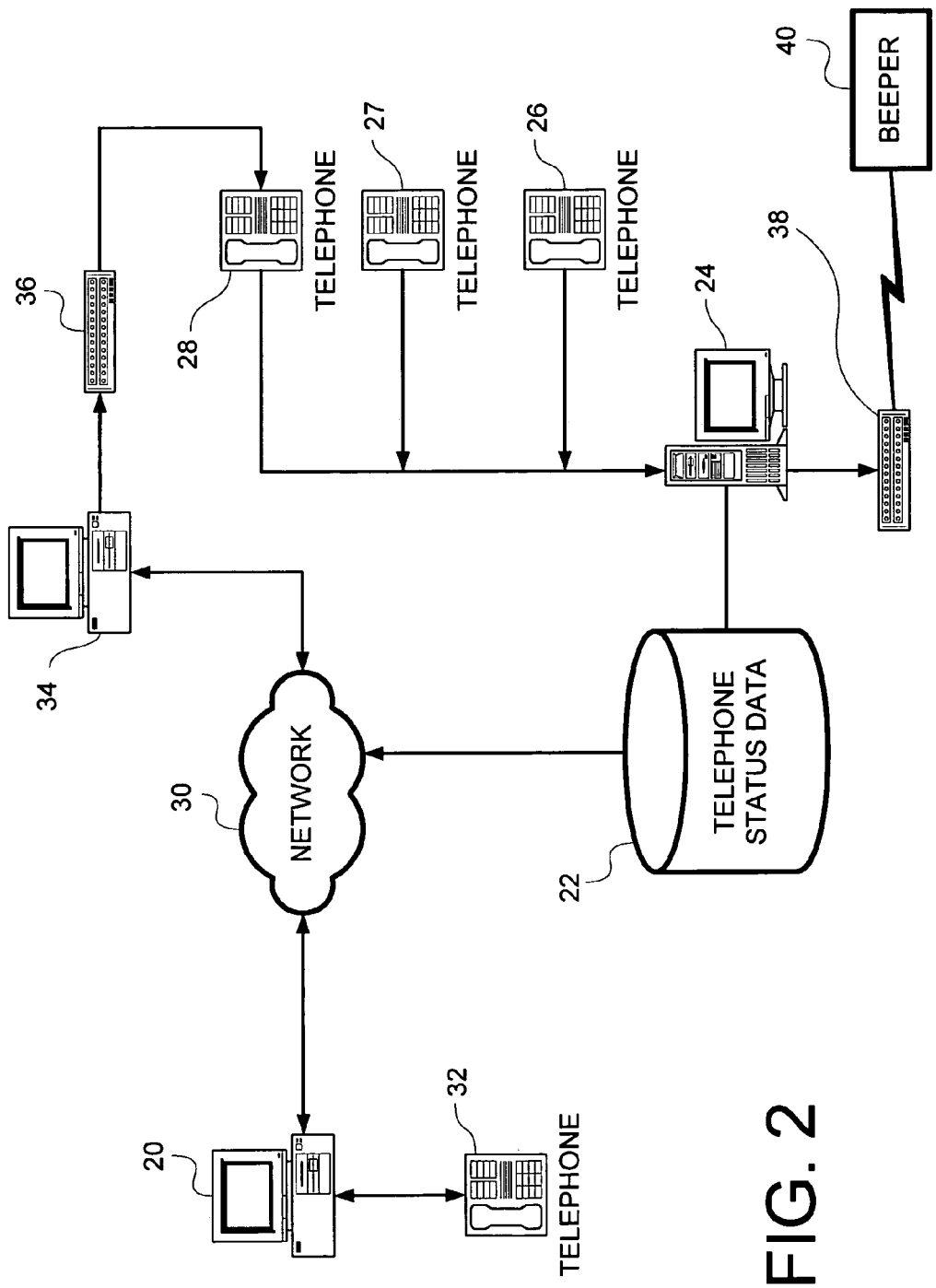
FIG. 2 illustrates a telephone status monitor according to an alternate embodiment of the present invention.

Referring to FIG. 2, an alternate embodiment of the present invention is shown. In this case, calling party's PC 20 accesses the telephone status file 22 over the Internet 30. Again, the telephone status file 22 is continually updated by a telephone status monitor 24 which monitors telephones 26 and 28 (again these are representative of a plurality of telephones fully monitored by the system). In this case, however, the calling party has a telephone 32 that is connected to the calling party's PC 20. When the calling party's PC 20 monitors the status of a called party via the status file 22 as soon as the called party status indicates an on-hook condition, the PC 20 will then place a telephone call to the called party. This makes the entire connection process an automated one. This embodiment finds particular utility in a private branch exchange (PBX) where a telco switch is ordinarily not monitoring individual telephones.

Although the invention may be embodied so as to monitor status any type of telephone, it has particular value for monitoring the status of ordinary telephones on the plain old telephone system (i.e., POTS telephones). That is because the POTS does not have the sort of telephone status monitoring features that may be included in newer generations of telephone networks.

Referring again to FIG. 2, the calling party may also send an e-mail to the called party's PC 34. The e-mail is converted from text to digital voice at converter 36 and routed to the voice mail box 36 and routed to the voice mail box 36 of the called party.

Figure 3:
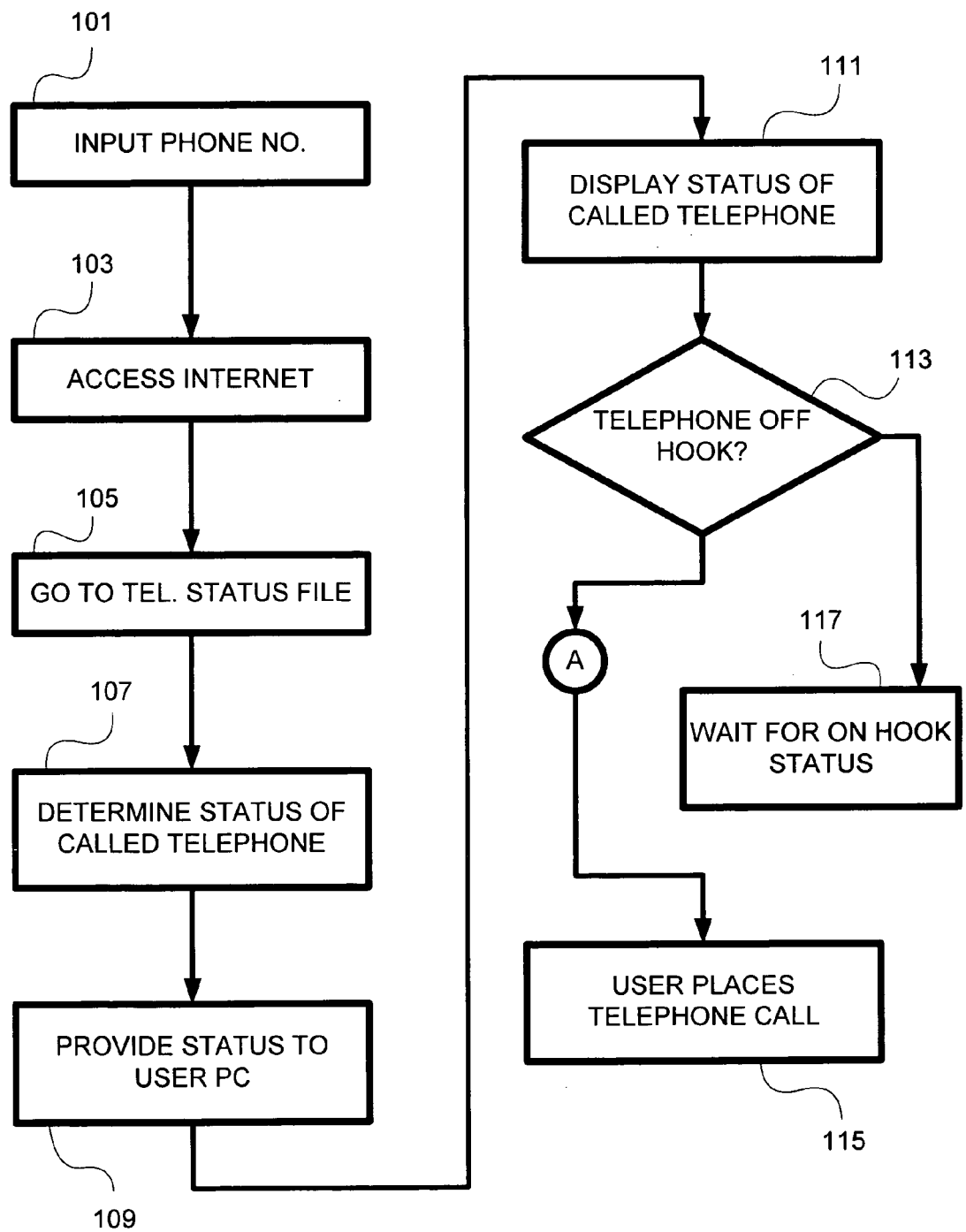
FIG. 3 illustrates an operational process of a telephone status monitor according to the present invention.

Referring to FIG. 3, the flow of the method of the present invention is shown. A calling party having a PC inputs a telephone number to be called (the called party) 101. Thereafter, the calling party's PC connects to the Internet 103 subsequently accesses the telephone status file 105. The status of the called party s telephone number is then determined 107 and that status is provided back to the calling party's PC 109 noting that status of the called party's telephone line.

Upon receipt of the called party's status, that information is displayed for the calling party 111 and thereafter, if the called party's telephone line status is in an on-hook condition, the user can then dial the called party 113.

Figure 4:
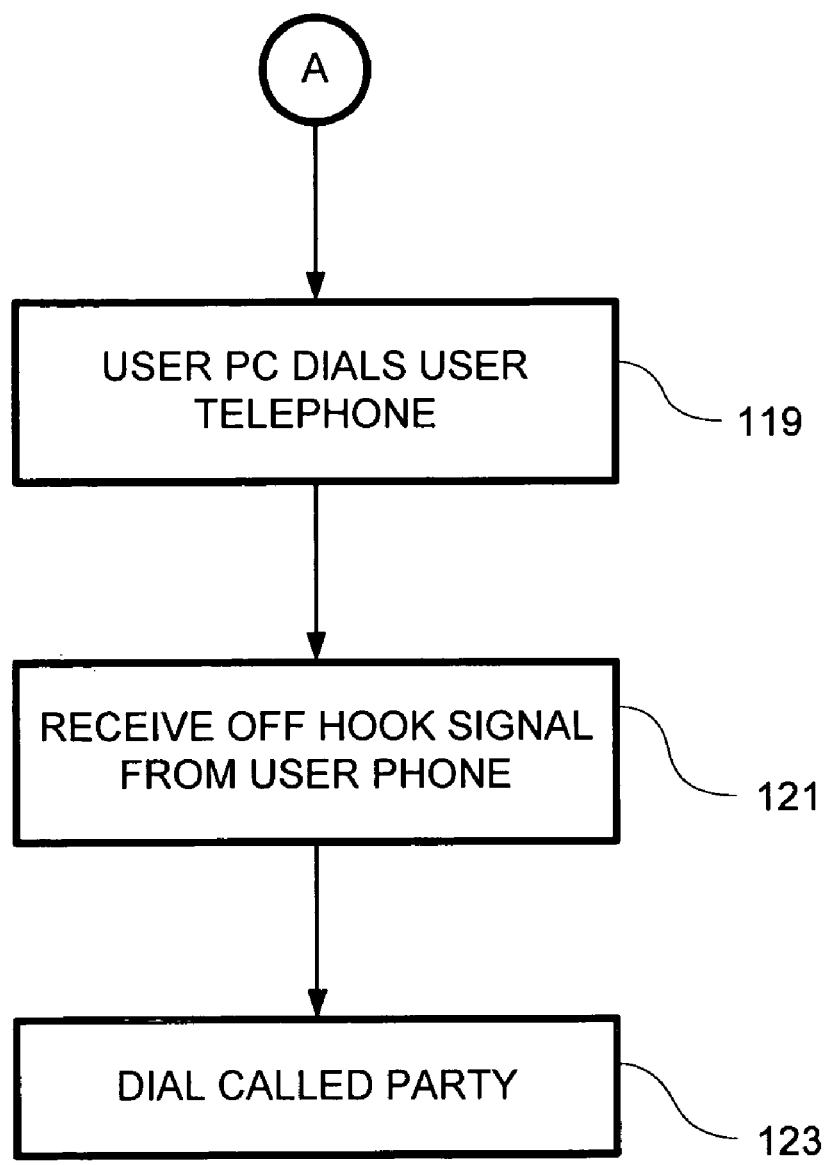
FIG. 4 illustrates an operational process of a telephone status monitor according to an alternate embodiment.

Referring to FIG. 4, an alternate embodiment of the present invention is shown. All of the steps of the access to the status of the called party's telephone line is the same is noted previously in FIG. 3. However, instead of the user making the telephone call, the PC continually monitors the telephone status file. Upon noting that the called party's telephone status is in an on-hook condition, the calling party's PC dials the called party's telephone 115. The calling party's PC then waits to receive an on-hook signal from the called party's telephone 117, thereby signaling that the calling party is on the telephone ready to make the telephone call. The calling party's PC then places the telephone call to the called party's telephone 119, thereby completing the telephone call. It should be noted that at the present time it is possible to place a telephone call over the Internet. Therefore, the calling party's PC can place the call over the Internet to a called party's telephone or, in the alternative, the calling party's PC can simply place a call over the public switch telephone network to the called party's telephone.

Figure 5:
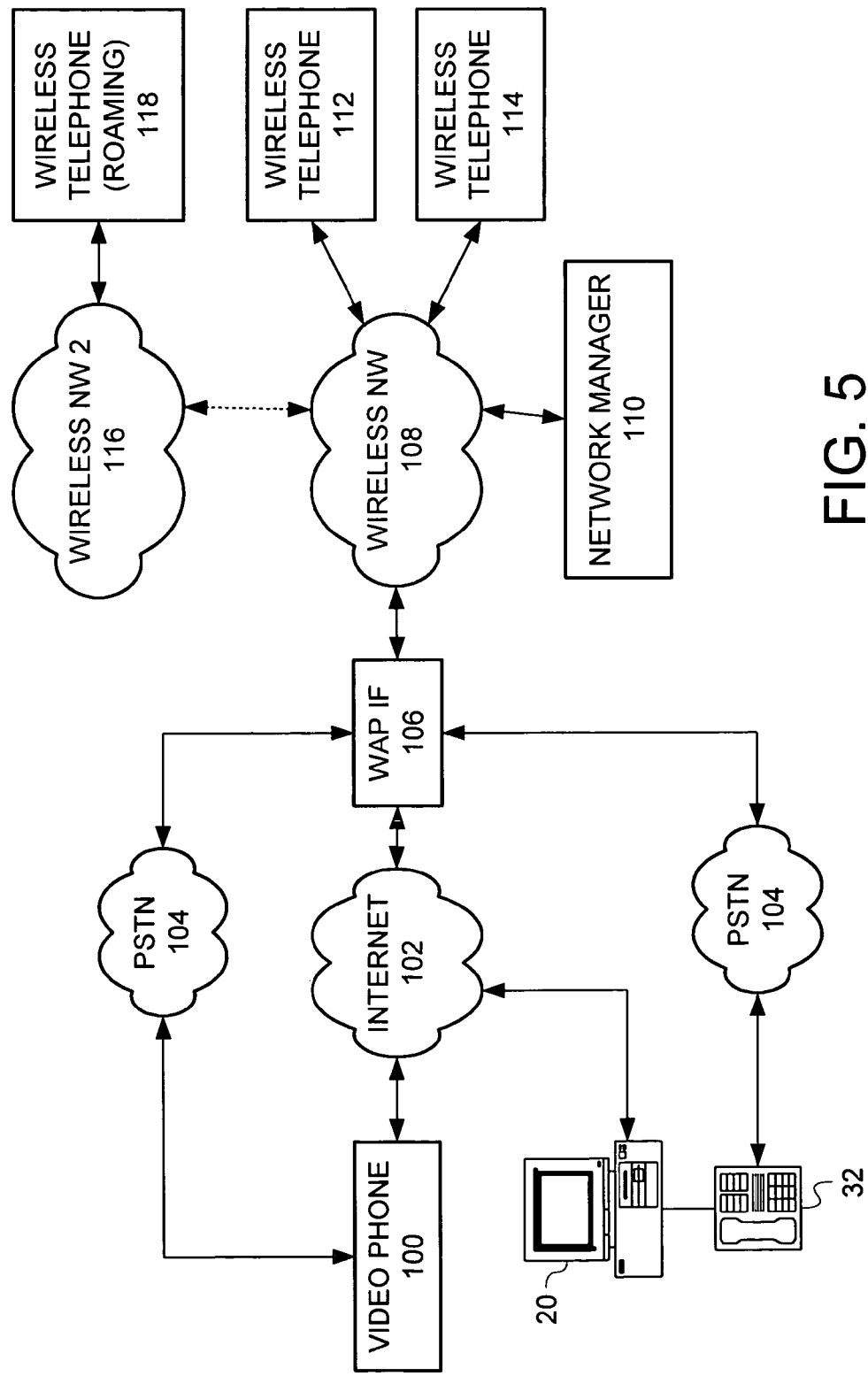
FIG. 5 illustrates a telephone status monitor system embodiment using wireless network components.

Referring to FIG. 5, an alternative embodiment of the present invention is illustrated. While it is important for long-distance callers to be able to ascertain whether the party is online or not, this is also particularly important when one is dealing with wireless communications. For example, and as described earlier, personal computer 20 can connect to, for example, the Internet 102 to ascertain the status of wireless telephones 112, 114, and 118. The query concerning the telephone status then proceeds through a wireless application protocol (WAP) interface 106 to wireless network 108. The request then flows to the wireless network manager 110 which records which wireless phones are currently available on the network and, of key importance, which of those telephones is engaged in an active telephone call. Thus network manager knows that wireless telephones 112 and 114 are available for telephone calls or in the alternative that, for example, wireless telephone 114 is engaged in an active phone call. This information is then sent by network manager 110 over wireless network 108 through WAP interface 106 through Internet 102 to PC 20. At that point the user can decide to make a telephone call using conventional telephone 32 over the public switch telephone network 104 through the WAP interface 106 over wireless network 108 to the wireless telephones 112, 114. Alternatively, telephone 32 can place its call through PC 20 via Internet telephony over the Internet 102 to the wireless telephones 112, 114.

This knowledge of the status of telephones in a wireless system is particularly important, since certain trends exist to charge only the caller for calls that are to be made to or from a wireless network. This is consistent with the current method of charging for telephone calls over a public switch telephone network. Thus, in a situation where a caller is charged for all telephone calls made, it will be particularly important to the caller that it not get charged for leaving a message over a wireless network which tends to be particularly expensive.

The expense in dealing with a wireless network is all the more apparent when one considers that a telephone may be in a "roaming" mode where the telephone is in a network which is not the home network for the wireless telephone. Thus, in the case where wireless telephone 118 is roaming in a second wireless network 116, a telephone call that is not completed or wherein a message is simply left, becomes all the more expensive since roaming charges will be charged to the caller as well.

It is also important to note that an entire generation of video phones 100 are becoming available. The video phone in certain instances will take the place of personal computer 20 for interacting with the Internet and making telephone calls. Such a telephone is the I phone® model 2050, for example, whose functionality, technical aspects, and capabilities are incorporated herein by reference in their entirety. Such a video phone 100 can also interact with Internet 102 through WAP interface 106 to ascertain the status of wireless telephones 112, 114 over wireless network 108. When information is subsequently displayed on video phone 100 regarding the availability of wireless telephones 112, 114, a call can be placed either over the Internet 102 or over public switch telephone network 104 through the wireless network to the wireless telephones desired.

A telephone line status monitoring system and method has been described herein. It will be appreciated by those skilled in the art that minor modifications to the present invention could be made without departing from the scope of the invention as disclosed. For example, it is also possible with the system of the present invention to monitor temperature of the home. In this instance, the system has a thermostat in place of the telephone system. The thermostat places its readings into a file over the Internet which can be read by a user when the user is at a remote location. In this manner the user can monitor home temperature during absences.

Monitoring of temperature is also useful for refrigerators, freezers, and commercial HVAC systems. The present invention allows for problems in such thermal systems to be monitored remotely, spotted early, and corrected before any serious economic consequences occur.

Similarly, just as messages can be transmitted to the user of the telephone, so can instructions to raise or lower temperature in the home be transmitted to the thermostat over the Internet.

Alarm monitoring can also be accomplished using the system and method of the present invention. In this instance, when an alarm goes off, the alarm company can be notified in the normal fashion. However, the alarm could also be noted in a file to be reviewed by a user when the user is away from the premises. In this case the user will know an alarm has gone off and can contact the alarm company to ascertain the meaning of the alarm.

An additional embodiment of the alarm concept of the present invention is for a formatted email to be sent to the owner of the premises so that the owner can have more specific notification of the meaning of any alarm that goes off.

A telephone status monitoring system and method has now been shown. It will be appreciated by those skilled in the art that other equipment in the home of office may be monitored as well using the system of the present invention without departing from the scope of the invention as disclosed.

The present invention has been described in terms of preferred embodiments, however, it will be appreciated that various modifications and improvements may be made to the described embodiments without departing from the scope of the invention. The present invention is limited only by the appended claims.

What is claimed is:

1. A process for a calling party to determine device status of a called party wireless telecommunication device over a network, the process comprising:
   inputting a tolephone number corresponding to the called party's wireless telecommunication device to a device status monitor over the network via a calling party processor;
   accessing a called party device status file over a network, wherein status of the called party's wireless telecommunication device is made available via the called party device status file by the device status monitor; and
   sending the calling party a status message comprising the status of the called party's wireless telecommunication device, wherein the status message is sent via a pager.

2. The process of claim 1, wherein the pager is a component of a cellular phone.

3. The process of claim 2, wherein the pager comprises a display and sending the calling party a status message comprises displaying a message on the display.

4. The process of claim 1, wherein the status message is a text message and wherein the text message is sent to a wireless phone.

5. A process for determining wireless telecommunication device status comprising:
   accessing a wireless telecommunication device status file associated with a called party over a network;
   monitoring the status of the called party's wireless telecommunication device and providing that device status to the device status file; and
   sending a calling party a status message comprising the status of the called party's wireless telecommunication device, wherein the status message is sent via a pager.

6. The process of claim 5, wherein the pager is a component of a cellular phone.

7. The process of claim 6, wherein the pager comprises a display and sending the calling party a status message comprises displaying a message on the display.

8. The process of claim 5, wherein the status message is a text message and the text message is sent to a wireless phone.

* * * * *